(12) United States Patent  
Alvestad et al.

(10) Patent No.: US 9,115,577 B2  
(45) Date of Patent: Aug. 25, 2015

(54) SOLVENT INJECTION RECOVERY PROCESS

(75) Inventors: Jostein Alvestad, Trondheim (NO); Aurelie Lagisquet, Calgary (CA); Eimund Gilje, Oltedal (NO)

(73) Assignee: STATOIL ASA, Stavanger (NO)

( * ) Notice: Subject to any disclaimer, the term of this patent is extended or adjusted under 35 U.S.C. 154(b) by 434 days.

(21) Appl. No.: 13/576,956

(22) PCT Filed: Feb. 3, 2011

(86) PCT No.: PCT/EP2011/051554  
§ 371 (c)(1),  
(2), (4) Date: Sep. 19, 2012

(87) PCT Pub. No.: WO2011/095542  
PCT Pub. Date: Aug. 11, 2011

(65) Prior Publication Data  
US 2013/0000894 A1 Jan. 3, 2013

(30) Foreign Application Priority Data  
Feb. 4, 2010 (CA) ..................... 2691889

(51) Int. Cl.  
*E21B 43/24* (2006.01)  
*C09K 8/592* (2006.01)

(52) U.S. Cl.  
CPC ............. *E21B 43/2408* (2013.01); *C09K 8/592* (2013.01); *E21B 43/24* (2013.01)

(58) Field of Classification Search  
CPC ... E21B 43/24; E21B 43/243; E21B 43/2401; E21B 43/30; E21B 36/04; E21B 41/0057; C09K 8/592  
See application file for complete search history.

(56) References Cited

U.S. PATENT DOCUMENTS

| 4,109,720 A | 8/1978 | Allen et al. |
| 4,344,485 A | 8/1982 | Butler |

(Continued)

FOREIGN PATENT DOCUMENTS

| CA | 2235085 A1 | 10/1999 |
| CA | 2567399 A1 | 10/1999 |

(Continued)

OTHER PUBLICATIONS

Albahlani et al., "A Critical Review of the Status of SAGD: Where Are We and What is Next?," Society of Petroleum Engineers, 2008, pp. 1-22.

(Continued)

*Primary Examiner* — Zakiya W Bates  
(74) *Attorney, Agent, or Firm* — Birch, Stewart, Kolasch & Birch, LLP

(57) ABSTRACT

A process for the recovery of hydrocarbon such as bitumen/EHO from a hydrocarbon bearing formation in which are situated an upper injection well and a lower production well, the method comprising the steps: preheating an area around and between the wells by circulating hot solvent through the completed interval of each of the wells until sufficient hydraulic communication between both wells is achieved; injecting one of more hydrocarbon solvents into the upper injection well at or above critical temperature of the solvent or solvent mixture, thereby causing a mixture of hydrocarbon and solvent to flow by gravity drainage to the lower production well; and producing the hydrocarbon to the surface through the lower production well.

8 Claims, 3 Drawing Sheets

(56) References Cited

U.S. PATENT DOCUMENTS

| | | | |
|---|---|---|---|
| 5,899,274 | A | 5/1999 | Frauenfeld et al. |
| 6,883,607 | B2 | 4/2005 | Nenniger et al. |
| 7,363,973 | B2 | 4/2008 | Nenniger et al. |
| 2005/0072567 | A1 | 4/2005 | Steele et al. |
| 2008/0017372 | A1 | 1/2008 | Gates et al. |

FOREIGN PATENT DOCUMENTS

| | | |
|---|---|---|
| CA | 2299790 A1 | 8/2001 |
| CA | 2633061 A1 | 8/2001 |
| CA | 2351148 A1 | 12/2002 |
| CA | 2436158 A1 | 1/2005 |
| CA | 2549614 A1 | 12/2007 |
| CA | 2552482 A1 | 1/2008 |
| CA | 2591354 A1 | 12/2008 |
| CA | 2639851 A1 | 3/2010 |
| CA | 2374115 C | 5/2010 |
| WO | WO 99/67503 A1 | 12/1999 |
| WO | WO 2008/009114 A1 | 1/2008 |

OTHER PUBLICATIONS

Gupta et al., "Insights Into Some Key Issues With Solvent Aided Process," Journal of Canadian Petroleum Technology, vol. 43, No. 2, Feb. 2003, pp. 54-61.

Nenniger et al., "Dew Point vs Bubble Point: A Misunderstood Constraint on Gravity Drainage Processes," Proceedings of the Canadian International Petroleum Conference (CIPC) 2009, Paper 2009-065, Jun. 16-18, 2009, pp. 1-16.

Nenniger et al., "How Fast in Solvent Based Gravity Drainage?", Proceedings of the Canadian International Petroleum Conference/ SPE Gas Technology Symposium 2008 Joint Conference (The Petroleum Society's 59th Annual Technical Meeting), Paper 2008-139, Jun. 17-19, 2008, pp. 1-14.

International Search Report issued in PCT/EP2011/051554, mailed on Jan. 9, 2012.

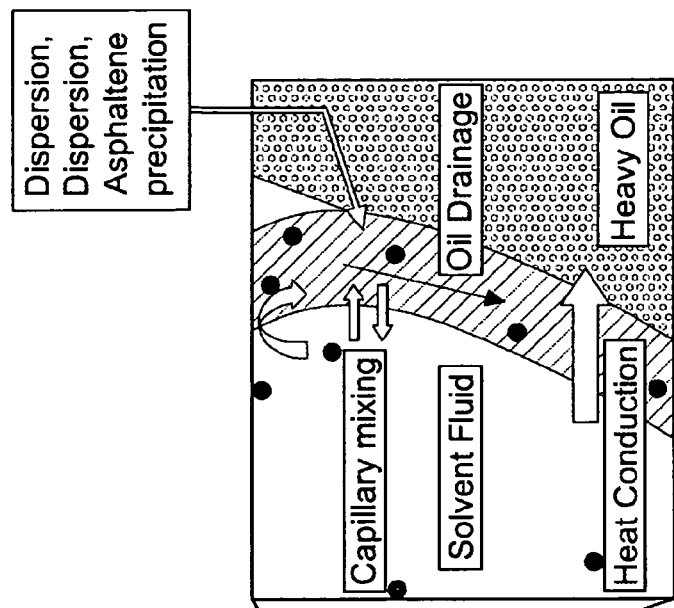
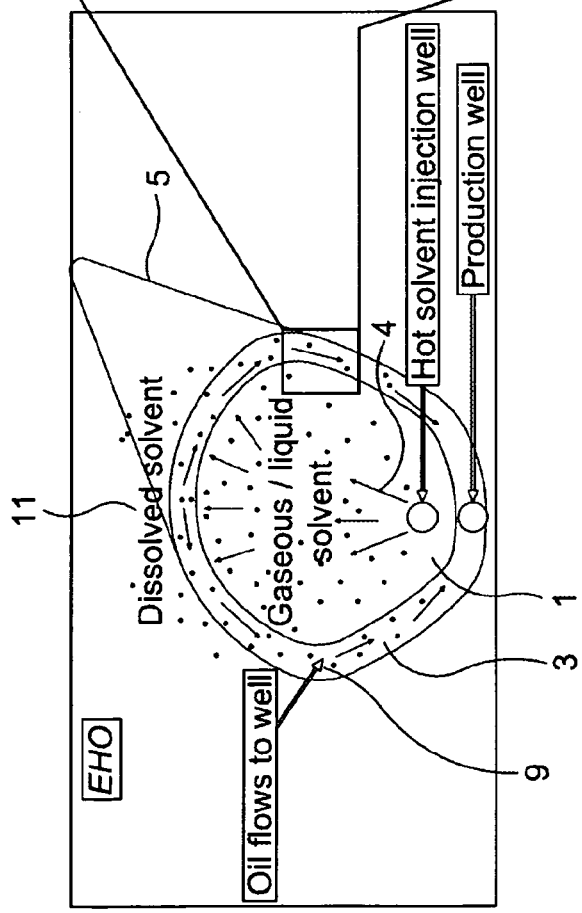
FIG 1b
FIG 1a

SOLVENT INJECTION RECOVERY PROCESS

FIELD OF THE INVENTION

The present invention relates to a solvent injection method for recovery of bitumen and extra heavy oil (EHO).

BACKGROUND OF THE INVENTION

Recent recovery methods include steam assisted gravity drainage (SAGD) and the solvent co-injection variant thereof. Another method is the so-called N-Solv process.

SAGD (Albahlani, A. M., Babadagli, T., "A Critical review of the Status of SAGD: Where Are We and What is Next?", SPE 113283, 2008 SPE Western Regional, Bakersfield Calif.) is a method of recovering bitumen and EHO which dates back to the 1960's. A pair of wells is drilled, one above the other. The upper well is used to inject steam, optionally with a solvent. The lower well is used to collect the hot bitumen or EHO and condensed water from the steam. The injected steam forms a chamber that grows within the formation. The steam heats the oil/bitumen and reduces its viscosity so that it can flow into the lower well. Gases thus released rise in the steam chamber, filling the void space left by the oil. Oil and water flow is by a countercurrent gravity driven drainage into the lower well bore. Condensed water and the bitumen or EHO is pumped to the surface. Recovery levels can be as high as 70% to 80%. SAGD is more economic than with the older pressure-driven steam process.

The solvent co-injection variant of the SAGD process (Gupta, S., Gittins, S., Picherack, P., "Insights Into Some Key Issues With Solvent Aided Process", JCPT, February 2003, Vol 43, No 2) aims to improve the performance of SAGD by introducing hydrocarbon solvent additives to the injected steam. The operating conditions for the solvent co-injection process are similar to SAGD.

In the N-Solv process (Nenniger, J. E., Gunnewiek, L, "Dew Point vs Bubble Point: A Misunderstood Constraint on Gravity Drainage Processes", CIPC 2009, paper 065; Nenniger, J. E., Dunn, S. G. "How Fast is Solvent Based Gravity Drainage", CIPC 2008, paper 139), heated solvent vapour is injected into a gravity drainage chamber. Vapour flows from the injection well to the colder perimeter of the chamber where it condenses, delivering heat and fresh solvent directly to the bitumen extraction interface. The N-Solv extraction temperature and pressure are lower than with in situ steam SAGD. The use of solvent is also capable of extracting valuable components in bitumen while leaving high molecular weight coke forming species behind. Condensed solvent and oil then drain by gravity to the bottom of the chamber and are recovered via the production well. Some details of solvent extraction processes are described in CA 2 351 148, CA 2 299 790 and CA 2 552 482.

DEFINITION OF THE INVENTION

In its broadest sense, the present invention provides a process for the recovery of hydrocarbons from a hydrocarbon bearing formation in which are situated an upper injection well and a lower production well, wherein there is hydraulic communication between said wells, the method comprising the steps:

injecting one of more hydrocarbon solvents into the upper injection well at or above critical temperature of the solvent or solvent mixture, thereby causing a mixture of hydrocarbons and solvent to collect in the lower production well; and extracting the hydrocarbons from the lower production well.

In another broad sense, the present invention also provides a process for the recovery of hydrocarbons from a hydrocarbon bearing formation in which are situated an upper injection well and a lower production well wherein there is hydraulic communication between said wells, the method comprising the steps:

injecting one of more hydrocarbon solvents into the upper injection well so that the temperature of the solvent or solvent mixture in the upper injection well is 90° C. or more, thereby causing a mixture of hydrocarbons and solvent to collect in the lower production well; and extracting the hydrocarbons from the lower production well.

A first aspect of the present invention provides a process for the recovery of hydrocarbons from a hydrocarbon bearing formation in which are situated an upper injection well and a lower production well, the method comprising the steps:

preheating an area around and between the wells by circulating hot solvent through at least part of both of the wells until hydraulic communication between both wells is achieved;

injecting one of more hydrocarbon solvents into the upper injection well at or above critical temperature of the solvent or solvent mixture, thereby causing a mixture of hydrocarbons and solvent to collect in the lower production well; and extracting the hydrocarbons from the lower production well.

A second aspect of the present invention provides a process for the recovery of hydrocarbons from a hydrocarbon bearing formation in which are situated an upper injection well and a lower production well, the method comprising the steps:

preheating an area around and between the wells by circulating hot solvent through the completed interval of each of the wells until hydraulic communication between both wells is achieved;

injecting one of more hydrocarbon solvents into the upper injection well so that the temperature of the solvent or solvent mixture in the upper injection well is 90° C. or more, thereby causing a mixture of hydrocarbons and solvent to collect in the lower production well; and extracting the hydrocarbons from the lower production well.

A third aspect of the present invention provides a process for the recovery of hydrocarbons from a hydrocarbon bearing formation in which are situated an upper injection well and a lower production well, the method comprising the following steps:

preheating an area around and between the wells by circulating hot solvent through at least part of both of the wells until sufficient hydraulic communication between both wells is achieved;

injecting one or more hydrocarbon solvents into the upper injection well at or above critical temperature of the solvent or solvent mixture, thereby:

i) creating a hot solvent chamber consisting of solvent vapour and liquid, ii) mixing of the bitumen and the solvent at the boundary of the solvent chamber so formed, and iii) causing a mixture of the hydrocarbon and solvent to drain downwards by gravity and sideways by pressure gradient towards the lower production well; and producing the mixture to the surface through the lower production well.

A fourth aspect of the present invention provides a process for the recovery of hydrocarbons from a hydrocarbon bearing formation in which are situated an upper injection well and a lower production well, the method comprising the steps:

preheating the region between the wells by circulating hot solvent through at least part of both of the wells until hydraulic communication between both wells is achieved;

injecting one or more hydrocarbon solvents into the upper injection well so that the temperature of the solvent or solvent mixture within the upper injection well is 90° C. or more, thereby:

i) creating a hot solvent chamber consisting of solvent vapour and liquid, ii) mixing of the bitumen and the solvent at the boundary of the solvent chamber so formed, and iii) causing a mixture of the hydrocarbon and solvent to drain downwards by gravity and sideways by pressure gradient towards the lower production well; and producing the mixture to the surface through the lower production well.

The N-Solv process operates at low temperatures (typically up to 70° C.,) and uses propane as the preferred solvent. This can result in low drainage rates.

SAGD and SAGD with solvent co-injection operate above 200° C. so the energy usage is high.

In contrast, the present invention preferably injects the hydrocarbon solvent or solvent mixture at a temperature of 90° C. to 400° C., more preferably at a temperature of 150° C. to 300° C. No steam is utilised in the process.

Typical solvents are the lower alkanes, with butane or pentane being preferred.

The present invention offers lower energy utilisation rates and does not require any use of water. $CO_2$ emissions are also considerably lower. The present invention also achieves faster oil drainage rates than the N-Solv process due to employing a significantly higher solvent chamber temperature than N-Solv extraction temperature. De-asphalting of the bitumen/EHO at the boundary layer between the solvent chamber and the bitumen/EHO region can occur also in the high temperature solvent injection process of the present invention.

DETAILED DESCRIPTION OF THE INVENTION

In essence, the present invention is a gravity-based thermal recovery process of bitumen and extra heavy oil. A preferred class of embodiments of this recovery process entails use of a pair of substantially parallel horizontal wells, located above each other, at a vertical distance of typically from 2 to 20 meters, say 5 meters, placed at the bottom of the reservoir.

The area around and between the wells is heated by circulating hot solvent through the completed interval of each of the wells until sufficient hydraulic communication between the wells is achieved.

After the pre-heating period is finished the upper well is converted to an injector and the bottom well to a producer.

A hydrocarbon solvent (or mixture of hydrocarbon solvents) of technical grade is injected in the upper well at or above critical temperature.

A mixture of bitumen/EHO and solvent is produced through the bottom well.

The solvent is separated from the produced well stream and recycled.

At the end of the production period, the solvent is back produced by means of injection of non-condensable gases and pressure reduction. A non-condensable gas (which is less dense than the solvent/solvent mixture) is injected in the injection well, and displaces the solvent/solvent mixture by gravity driven flooding process. The solvent/solvent mixture and the injected non-condensable gas are produced through the producer well. The non-condensable gas is separated from the solvent/solvent mixture at the surface and re-injected until sufficient recovery of the solvent/solvent mixture is achieved.

The mechanisms which underlie this process are as follows:

Establishment and expansion of a solvent chamber,

Condensation of the solvent occurs far from the interface with the solvent chamber and the cold bitumen, The bitumen/EHO is heated by conduction to the solvent temperature in the vicinity of the solvent interface (typically a few meters), Solubilisation of solvent into oil by mechanical/convective mixing and thereby bitumen/extra heavy oil viscosity reduction, De-asphalting of the bitumen/EHO (upgrading and viscosity reduction of the bitumen/EHO), Gravity drainage of bitumen/EHO.

Typical solvents usable in this process of the present invention are lower alkanes, such as propane, butane or pentane, but not limited to these, and mixtures thereof. Butane or pentane are the solvents of choice providing good solubility and an optimum operating temperature for the process. The solvent is heavier than other solvents used in the prior art, such as propane, and this provides increased solubility in the bitumen but higher injection temperatures are required, beyond the critical temperature of the solvent, due to higher condensation temperature. The critical temperature of a solvent or solvent mixture is readily obtainable from standard texts. However, typical operating well temperature ranges for the process of the present invention, are, particularly for the solvents listed, in the range of 90-400° C., more preferably 150° C. to 300° C. The solvent injection rate is adjusted to the reservoir (chamber) properties.

Preferably, the gas is injected at a pressure of below 40 bars (approx. critical pressure of butane). Optimum operating pressures are between 8-25 bars, more specifically 15 to 25 bars for butane and 8 to 25 bars for pentane, to provide an optimal temperature range for the process. However, the pressure operating range will depend upon the solvent selected.

BRIEF DESCRIPTION OF THE DRAWINGS

FIG. 1A shows a vertical cross section perpendicular to the horizontal well pair used in a recovery process according to the present invention, viewed along the wells;

FIG. 1B shows an expanded detail of the solvent chamber-bitumen/EHO transition region;

DESCRIPTION OF PREFERRED EMBODIMENTS

Figure 2:
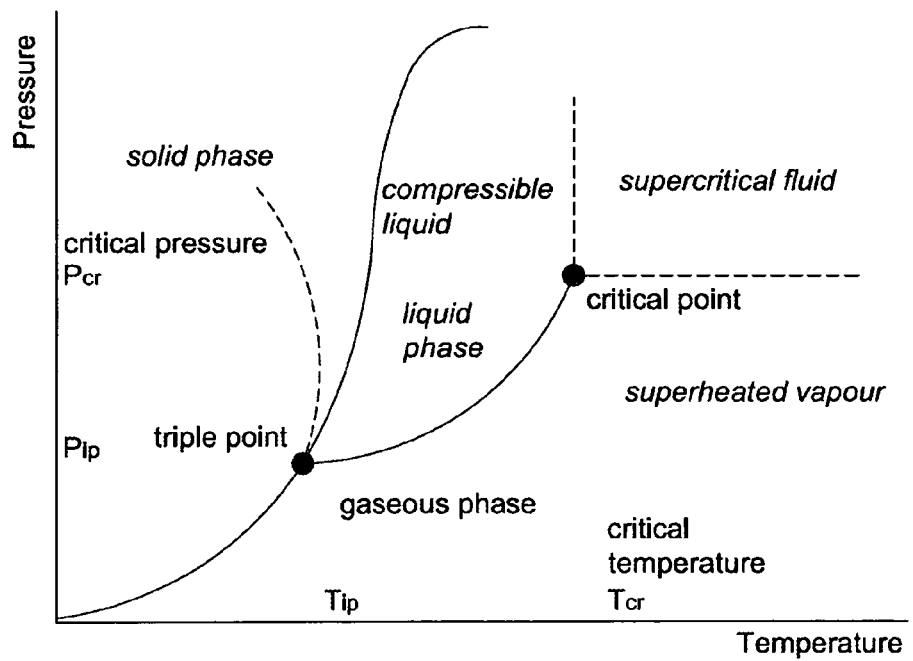
FIG. 2 is a plot of Pressure against Temperature illustrating the phase behaviour and the critical temperature of a substance.

FIG. 1A shows a vertical section perpendicular to the horizontal well pair used in a recovery process according to the present invention. The outer boundary of the solvent chamber is denoted by reference numeral 3. Situated below the upper well 1 is a production well 5. Hot solvent in vapour form is injected into the upper injection well 1 as denoted by arrows 7.

During the start-up period and prior to well conversion, the volume/region between the injection well 1 and the producing well 5, is pre-heated by circulation of hot solvent until sufficient hydraulic communication is established between the upper and lower wells. Bitumen/EHO flows (9) into the well.

Injection of hydrocarbon solvents as mentioned above causes a mixture of bitumen/EHO and solvent to:

drain downwards by gravity and sideways by pressure gradient to the lower well and be produced to the surface through the lower well by conventional well lifting means including down-hole pumps.

At the surface, the solvent can be recovered for recycling.

FIG. 1B shows an expanded detail of the solvent chamber-bitumen/EHO transition region. Solubilisation of solvent into the bitumen/EHO occurs by diffusive and convective mixing in the solvent chamber-bitumen/EHO transition region. The bitumen/EHO is de-asphalted in the presence of higher solvent concentration. As a result of both phenomena stated above, a lower viscosity mixture of bitumen/EHO and solvent flows by gravity drainage to the producing well 5.

It is to be appreciated that the solvent is injected into the upper injection well at or beyond the critical temperature of the solvent, as illustrated in FIG. 2.

Figure 3:
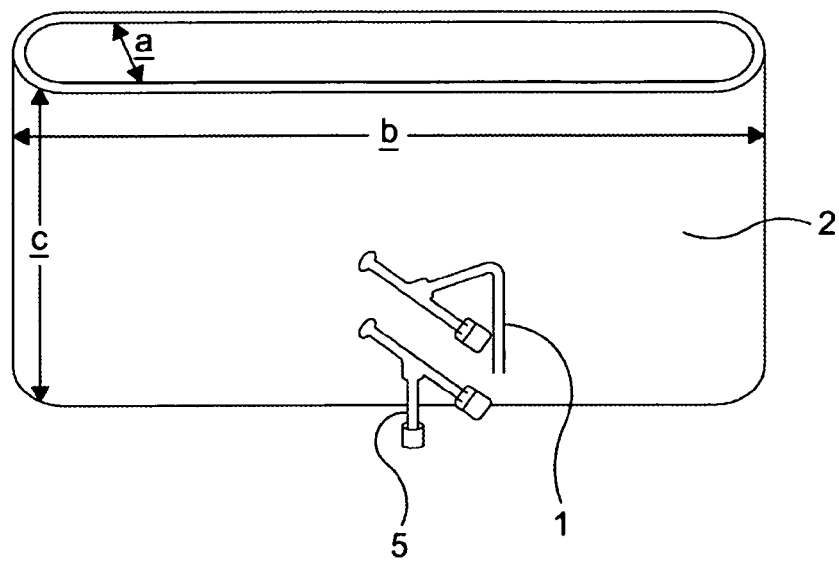
FIG. 3 is a schematic diagram of a physical model used to verify the recovery process according to one embodiment of the present invention.

FIG. 3 is a sketch of a physical model used to verify the superheated solvent recovery process according to an embodiment of the present invention. A cannister 2 having the dimensions 10 cm (a)×80 m (b)×24 cm (c) represents a small scale (1:100) model of a 2-dimensional symmetry element of a reservoir perpendicular to a pair of injection and production wells 1, 5. The cannister was packed with sand and saturated with water and bitumen. The process was then carried out with butane being injected into the cannister at an injection temperature from 150° C. to 260° C. with high grade bitumen being recovered via the production well.

The results from the experiments carried out demonstrate the suitability of the process for the recovery of bitumen and extra heavy oil. The process is capable of achieving high ultimate oil (bitumen) recoveries (approx. 80%) and the produced bitumen generally has an API 2-4 units higher than the original bitumen due to asphaltene precipitation in the model. The physical experiments have been simulated with numerical reservoir simulators and reproduced with reasonable accuracy. The up-scaled simulation results indicate that a production plant of 40,000 bbl/day would have a potential of an economy (NPV) that is better than SAGD and would use approx. 50-67% of the energy used in SAGD.

In the light of the described embodiments, modifications to these embodiments, as well as other embodiments, all within the spirit and scope of the present invention, for example as defined by the appended claims, will now become apparent to persons skilled in the art.

The invention claimed is:

1. A process for the recovery of hydrocarbons from a hydrocarbon bearing formation in which are situated an upper injection well and a lower production well, the method comprising the steps:

preheating the region between the wells by circulating hot solvent through at least part of both of the wells until hydraulic communication between both wells is achieved;

injecting butane into the upper injection well at or above its critical temperature, thereby:

i) creating a hot solvent chamber consisting of solvent vapour and liquid, ii) mixing of the bitumen and the solvent at the boundary of the solvent chamber so formed, and iii) causing a mixture of the hydrocarbon and solvent to drain downwards by gravity and sideways by pressure gradient towards the lower production well; and producing the mixture to the surface through the lower production well.

2. A process according to claim 1, wherein solvent is separated from the extracted mixture for recycling.

3. A process according to claim 1, wherein the preheating step heats the region between the upper injection well and the lower production well until sufficient hydraulic communication is established between the upper and lower wells.

4. A process according to claim 1, wherein during the preheating step, the wall of the upper injection well and bottom producing well are preheated to a temperature in the range from 150° C. to 400 20 C. in order to achieve hydraulic communication in the region between the wells.

5. A process according to claim 4, wherein the wall of the upper injection well is preheated to a temperature in the range from 150° C. to 300° C.

6. A process according to claim 1 wherein the hydrocarbon comprises bitumen and/or extra heavy oil (EHO).

7. The process according to claim 1, wherein the process does not include the use of steam.

8. The process according to claim 1, wherein the process does not include the use of water.

* * * * *

UNITED STATES PATENT AND TRADEMARK OFFICE
CERTIFICATE OF CORRECTION

PATENT NO. : 9,115,577 B2  Page 1 of 1
APPLICATION NO. : 13/576956
DATED : August 25, 2015
INVENTOR(S) : Jostein Alvestad et al.

It is certified that error appears in the above-identified patent and that said Letters Patent is hereby corrected as shown below:

IN THE CLAIMS:

In claim 4, at column 6, line 34, change "150° C. to 40020 C." to --150° C. to 400° C.--.

Signed and Sealed this
Twenty-sixth Day of July, 2016

Michelle K. Lee
*Director of the United States Patent and Trademark Office*